UNITED STATES PATENT OFFICE.

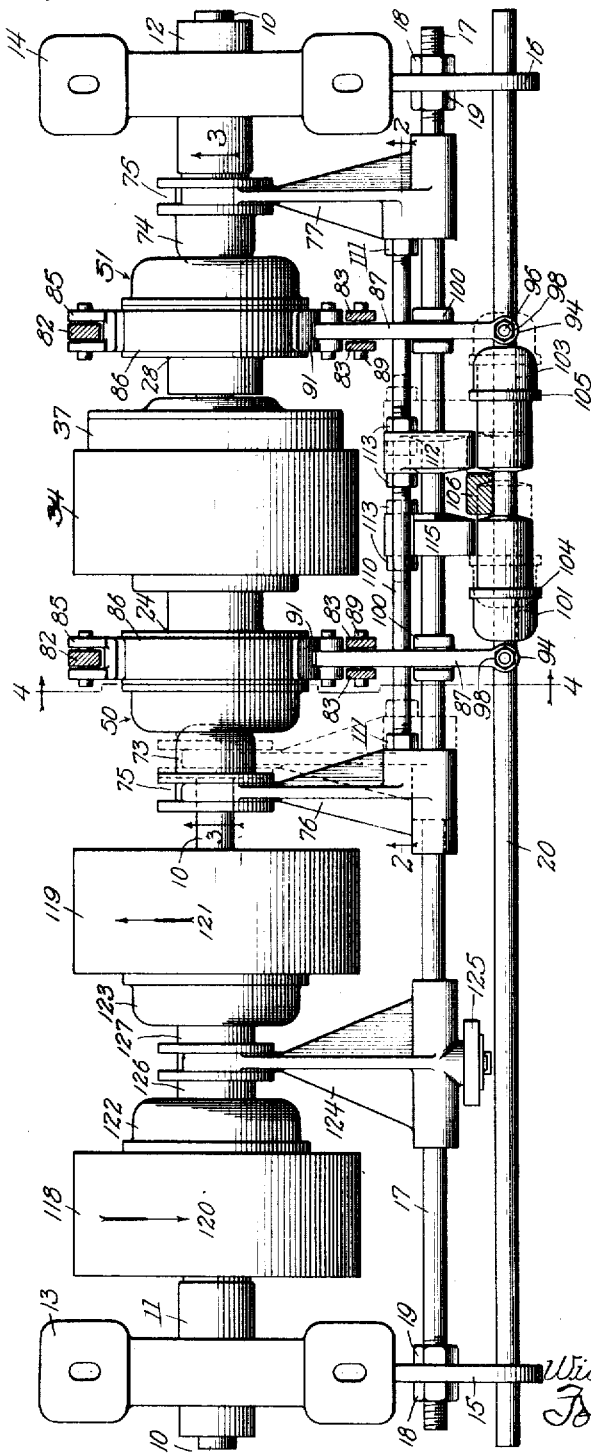

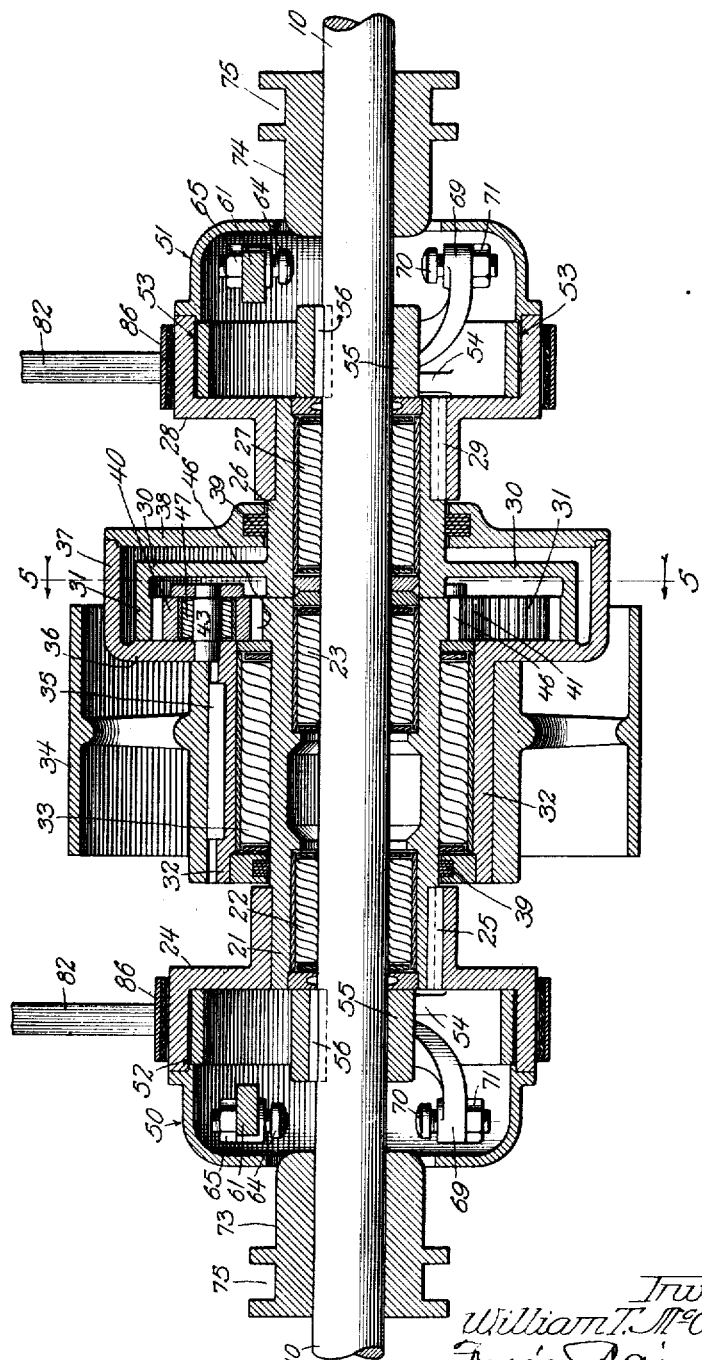

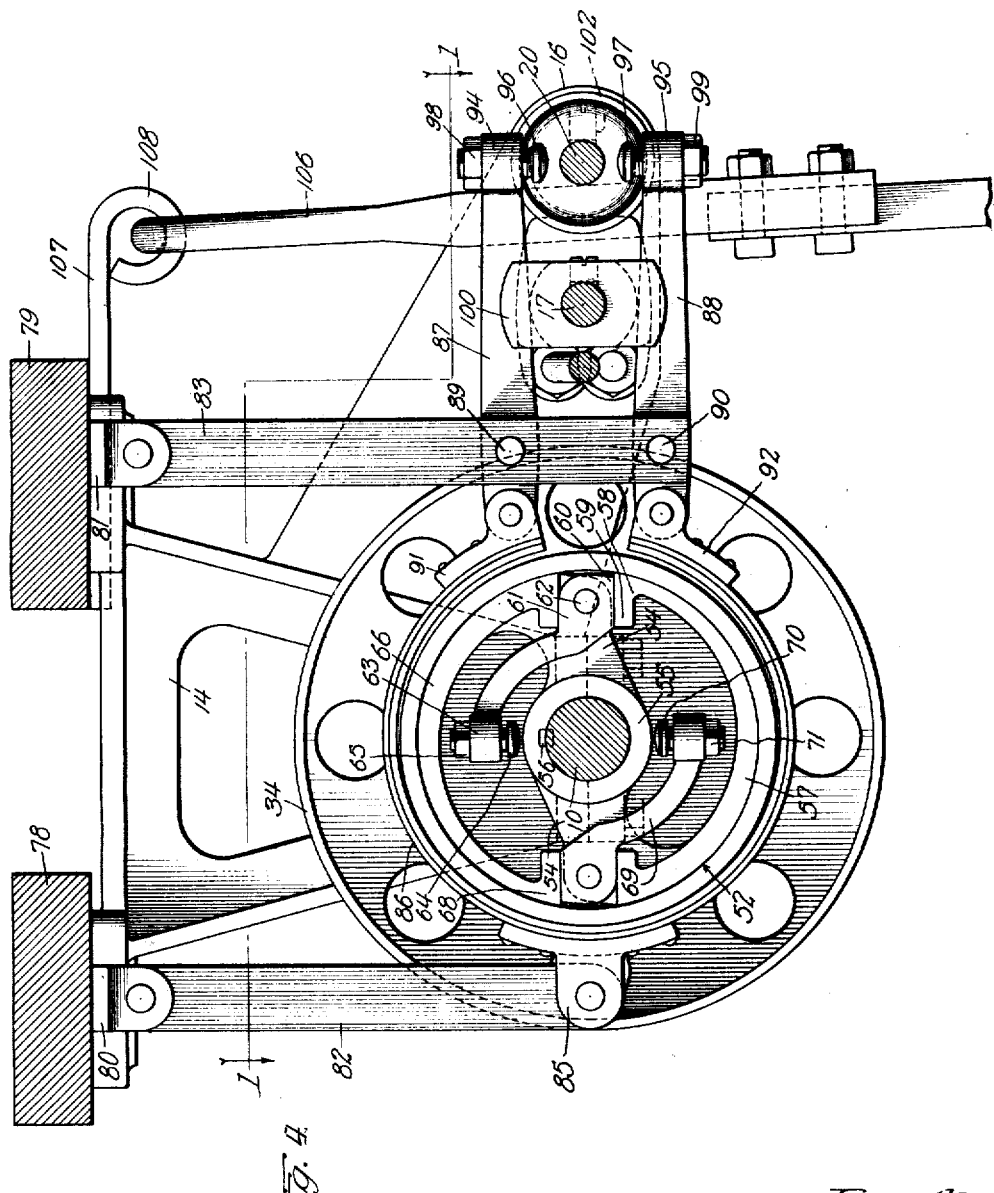

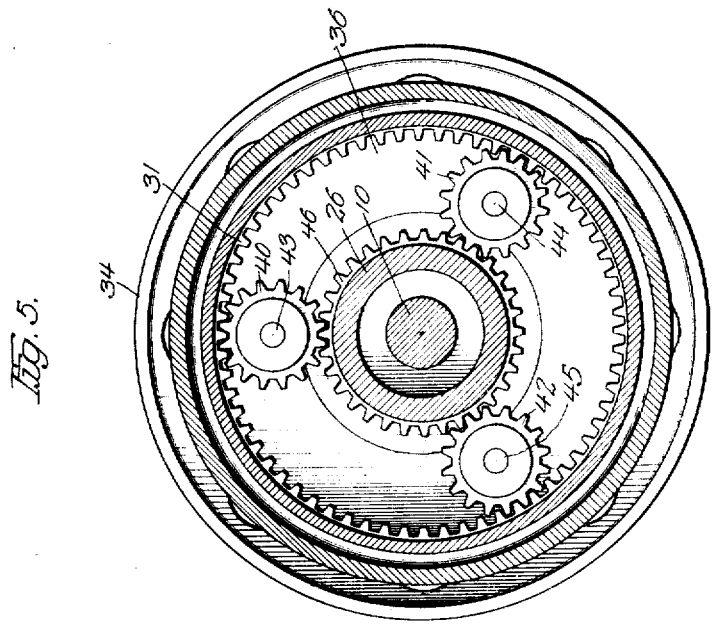
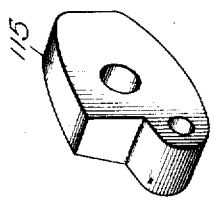

WILLIAM T. McCULLOUGH, OF CHICAGO, ILLINOIS.

POWER-TRANSMITTING DEVICE.

1,283,243.	Specification of Letters Patent.	Patented Oct. 29, 1918.

Application filed April 5, 1918. Serial No. 226,812.

*To all whom it may concern:*

Be it known that I, WILLIAM T. McCULLOUGH, a citizen of the United States, residing at Chicago, in the county of Cook and State of Illinois, have invented certain new and useful Improvements in Power-Transmitting Devices, of which the following is a specification.

My invention relates to variable speed gearing.

One of the objects of my invention is to provide speed changing gearing in which a member may be driven at variable, selected speeds, from a substantially constant-speed driving member without unmeshing the geared members.

In carrying my invention into effect I provide, preferably, a sun-and-planet system of gearing, comprising a so called sun-gear, intermeshing with a plurality of epicylic planetary gears and so arranged that the planetary gears intermesh with and are contained within a surrounding, internal-gear member.

In the specific structure, herewith illustrated, the planetary, or intermediate gears, are bodily carried by the driven member, while the associate sun-gear and internal gear may, selectively, be connected to the driving member, or held stationary, in accordance with the relative speed and torque effect to be transmitted to the driven member.

In the embodiment shown in the accompanying drawings forming a part hereof, the invention is especially well adapted for a counter-shaft for machine tools, such as lathes, shapers, milling machines, etc., where a plurality of speeds ahead and as many in reverse direction are obtainable without the shifting of belts.

In the accompanying drawings—

Figure 1 is a plan view showing parts in section, taken on line 1—1 of Fig. 4, of an organized mechanism for carrying my invention into effect, especially adapted for use as a counter-shaft.

Fig. 2 is a section, taken on line 2—2 of Fig. 1.

Fig. 3 is a section, taken on line 3—3 of Fig. 1.

Fig. 4 is an enlarged transverse section, taken on line 4—4 of Fig. 1.

Fig. 5 is a transverse section, taken on line 5—5 of Fig. 3.

Fig. 6 is a perspective view of a detail.

In all the views the same reference characters are employed to indicate similar parts.

A shaft 10 extends through the device, from end to end, and is supported in bearings 11 and 12 carried by hangers 13 and 14, respectively. Projecting laterally from the bearing ends of the hangers, 13 and 14, are plates or arms 15 and 16, respectively. A relatively stationary rod 17 threaded at its ends, is secured to the plates by threaded nuts 18 and 19, at each end. The rod 17 serves as a support for other parts of the mechanism, to be hereinafter described. Besides, it also serves as a spacing means to hold the hangers 13 and 14 properly spaced apart.

Another rod or shaft 20, is supported in bearings in the ends of the plates 15 and 16, and is axially slidable therein.

A sleeve 21 is supported on roller bearings 22 and 23, on the shaft 10, and is keyed to a housing 24, by a key 25. A similar, but shorter sleeve 26, is supported on roller bearings 27, on the shaft 10, and is keyed to a similar housing 28, by a key 29. The sleeve 26 is expanded radially into a flange 30 forming on its laterally turned edge an internal gear 31. The housing 28, and the internal gear 31 therefore always revolve together as one. A sleeve 32, rotates freely on roller bearings 33, on the sleeve 21, and is secured to a driven member or pulley 34, by a key 35. The sleeve 32 is expanded radially, as at 36, into a housing or casing 37. The other side 38 of the casing 37 rotates freely around the sleeve 26 over a ring or washer of felt, or the like, 39, which serves as a dust screw. The part 36 of the casing 37 carries three planetary gears 40, 41 and 42, which revolve on studs 43, 44 and 45, respectively, that are fixed in the disk 36. The disk is a part of and revolves with a driven wheel 34. The sleeve 21 is also expanded, at one end, into a sun-gear 46. The planetary gears 40, 41 and 42 mesh with the sun-gear 46 and with the internal-gear 31. The planetary gears are preferably mounted on roller bearings 47.

A clutch member 50 at one end, and another, 51, at the other end, each are provided with a split expansible ring, 52 and 53, respectively. The rings 52, 53 are each provided with a spoke 54 and a hub 55 the latter being keyed to the shaft 10, by a key 56. A segment 57 of the ring is continuous of the spoke 54 at one end, and is loose or free at the other end. It has at 58 an inturned part 59. The inturned part or shoulder 59 affords an abutment for the pivotal toe end 60, of the lever 61. The lever 61 is pivoted, as at 62, to a stud projecting from the spoke 54, and terminates in an end 63, in which is an adjustable screw 64, adapted to be secured in adjusted position by the nut 65 to regulate the extent of movement of the lever by its cone. When the free end 63 of the lever 61 is pushed outwardly by the cone, the toe 61 of the lever 60 pushes against the abutment 59 and expands the sections 52 of the ring into driving frictional contact with the housing 24 or 28, as the case may be. A similar section 66 of the ring, is continuous with the spoke, as at 54, and is split as at 68 and coöperates with a similar lever 69, in the same manner. This lever is also provided with an adjustable screw 70 adapted to be fixed in position by a nut 71.

It will now be manifest that when the outer free ends of the levers 61 and 69 are pushed outwardly in a direction away from each other, that the segments 65 and 66 of the rings 52 or 53 will be brought into frictional contact with the inner surfaces of the housings 24 or 28, as the case may be, the inner structures of these clutch mechanisms 50 and 51 being duplicates.

Freely slidable upon the rotatable shaft 10 are cones 73 and 74, each of which is annularly grooved, as at 75, for the inclusion of a fork 76 and 77, respectively. The forks 76 and 77 are each freely slidable upon the rod 17. Fixed to the over-head stringers, 78 and 79, to which the hangers 13 and 14 are secured, are clips 80 and 81, in which are pivoted sets of links 82 and 83—83, respectively. There are two sets of these links, one for each clutch member 50 and 51. On the lower free end of the link 82 is pivoted to a shoe 85, which is fixed to a friction band 86, one of which spans the outside surface of each of the housings, 24 and 28, respectively. Between the links 83—83 are two laterally extending parallel levers 87 and 88, pivoted thereto, as at 89 and 90, respectively. The inner ends of these levers each carries a shoe 91 and 92, respectively, which are secured to the ends of the brake band 86. The outer ends of the levers 87 and 88 are enlarged, as at 94 and 95, respectively, for threaded adjustable screws 96 and 97, which are secured in adjusted position by the nuts 98 and 99, respectively.

A guide block 100 is fixed to the rod 17 for each set of levers and serves as a guide, for the levers 87 and 88, to prevent any lateral motion thereof when they are brought into coöperation with their respective cones 101 and 103. The cones 101, 103 are spaced apart and are intended for coöperation with the respective clutches and to tighten their respective brake bands 86. The space between the cones admits a shifting lever 106 to be included therebetween. Each of these cones is provided with a flange 104, and 105, respectively. The lever 106 is suspended at its upper end from an eye 108, afforded by a laterally projecting arm 107, that is secured to the stringer 79. A rod 110 is connected to the fork 76 by a screw threaded connection and a nut 111. On the other end of the rod it carries a block 112 which is secured thereto by nuts 113. When this rod 110 is moved axially it moves the forked arm 76 coextensively on the fixed rod 17. A similar rod 114 is secured to the fork 77 by similar threaded nut connections and on its opposite end carries a block 115.

Means for rotating the shaft 10 may be afforded by the normally loose pulleys 118 and 119, adapted to be rotated in opposite directions, as shown by the arrows 120, 121. The clutches 122, 123 are similar in character to the clutches 50 and 51, heretofore described, operable by the double cone 126 and 127, axially movable on the shaft 10 by the forked arm 124. This arm may be moved by a shifting lever 125, which is pivoted thereto. When it is desirable to have the shaft 10 rotate in the direction shown by the arrow 121 the forked arm 124 is moved by the shifting lever 125 in direction toward the pulley 119. When it is desirable to rotate the shaft 10 in the opposite direction, the forked arm 124 is moved by the shifting lever 125, in the opposite direction. The pulleys 118 and 119 may be driven by a straight belt and by a cross belt, respectively, or by two straight belts driven at different speeds.

The operation of the device is briefly as follows:

In the position shown in the drawings, all of the clutches are out of engagement and the shaft 10 is free to be rotated without rotating any of the associated parts except the clutch rings 52 and 53, which are connected thereto by the keys 56.

Now when it is desirable to rotate the shaft 10, the forked arm 124 is moved toward the pulley 118 or 119, as the case may be. This clutches either of the pulleys 118 and 119 with the shaft 10. If now the lever 106 be held against the rod 20 and moved to the right, the cone 103 will be forced between levers 87 and 88, moving them apart and thus contracting the brake band 86 on the housing 28 and holding it and the gear 31 stationary. The lever also engages the block 112 and by the operation of the rod 110 and the fork 76, the cone 73 will be forced between the levers 61 and 69, thus expanding the ring 52 in the housing 24 and clutching it and the gear 46 to the shaft 10. The casing 37 and the driven member, in this instance the pulley, 34, will now be driven at a relatively slow speed.

If now, lever 106 is shifted from the extreme right to the extreme left, while being held against the rod 20, the latter will be moved axially and the cone 103 will be withdrawn from between its respective levers 87 and 88, thus releasing the brake band 86 and the gear 31. The flange 105 on the cone 103 will then be brought into contact with the block 112 thus pushing out cone 73 and releasing the clutch ring 52, whereupon the cone 101 will be forced between its levers 87 and 88, thus contracting the band 86 on the clutch housing 24, holding it and the sun gear 46 stationary, while the cone 74, through the operation of the block 115 and the rod 114 together with the fork 77, has been forced between the levers 61 and 69, expanding the ring 53 and clutching the housing 28 and the gear 31 to the shaft. As a result, the casing 37 and the pulley 34, will then be driven at an intermediate speed.

If the lever 106 is now swung over against the rod 17, and moved to the right, the block 112 will strike the flange 105 on the cone 103 and move it and the rod 20 and the cone 103 with it, thus releasing the brake band 86, and the cone 73 will be drawn into engagement with ring 52, while the clutch ring 53 is still engaged so that the two gears 46 and 31 are now clutched to the shaft and are revolved at shaft speed and since the gears are locked, the casing 37 and the pulley 34 revolves with them.

When it is desired to put the device through its paces, as heretofore described, with the parts rotating in the opposite direction to the example given, it is only necessary to swing the clutch-operating lever 125, so as to move the cones 126 and 127, in the opposite direction, when the same effect will be produced with all of the parts driven in the opposite direction; or double the number of speeds that will be obtained from the pulley 34 if the pulleys 118 and 119 are driven in the same direction at different speeds.

Of course the gear relation may be changed to suit conditions so that the various members may be driven at any desirable relative speed. Such changes are within the skill of persons versed in the art.

While I have herein shown a single embodiment of my invention, for the purpose of clear disclosure, it will be manifest, to persons skilled in the art, that many changes may be made in the arrangement and disposition of the parts within the scope of the appended claims and furthermore that other means for rotating the shaft 10 may be employed in lieu of the pulleys 118, 119 as heretofore described.

Having described my invention, what I claim is:—

1. A power transmitting mechanism comprising a driving and a driven member; a sun gear rotatable about the axis of said driving member; an internal gear independently rotatable about the axis of said members; intermediate planetary gears rotatable with the driven member; a clutch for the sun gear to connect it to the driving member; a clutch for the internal gear to connect it to the driving member; a brake for each member to hold the respective members to prevent its rotation and means for coincidentally operating the clutch of one member and the brake of the other member, alternatively.

2. A power transmitting mechanism comprising a driving and a driven member; a sun gear and an internal gear, each rotatable about the axes and independently of said members; intermediate planetary gears bodily rotatable with the driven member; a clutch for the sun gear to connect it to the driving member; a clutch for the internal gear to connect it to the driving member; a brake for each member to hold the respective members to prevent its rotation and means for releasing both brakes and for connecting both gears to the driving member.

3. A power transmitting mechanism comprising a shaft; a driven member, an internal gear and a sun gear, each freely rotatable about the same axis; intermediate planetary gears bodily rotatable with the driven member and intermeshing with said internal gear and said sun gear; means to clutch the sun gear to the shaft and means to hold it to prevent its rotation; means to clutch the internal gear to the shaft and means to hold it to prevent its rotation and means to simultaneously operate the clutch of one gear and the holding means of the other, alternatively.

4. A power transmitting mechanism comprising a shaft; a driven member, an internal gear and a sun gear, each freely rotatable about said shaft; intermediate planetary gears bodily rotatable with and carried by the driven member and intermeshing with said internal gear and said sun gear, and means to clutch the internal gear to the shaft and to simultaneously hold the sun gear to prevent its rotation whereby to drive the driven member at a relatively higher, or intermediate speed.

5. A power transmitting mechanism comprising a driving member; a driven member, an internal gear and a sun gear each freely rotatable about the same axis independently of said members; intermediate planetary gears, carried by the driven member, and intermeshing with said internal gear and said sun gear and means to simultaneously clutch the sun gear and the internal gear to the driving member whereby to drive the driven member at the same speed as that of the driving member.

6. A power transmitting, variable speed mechanism comprising a shaft; a sun gear, normally loose thereon; means to clutch the sun gear to the shaft; means to hold the sun gear stationary while the clutch is open; an internal gear, normally loose on the shaft; means to clutch the internal gear to the shaft; means to hold the internal gear stationary when the clutch is disengaged; a driven member; planetary pinions bodily rotatable with said driven member and in mesh with the other two gears and means for clutching one gear to the shaft and coincidentally holding the other gear stationary.

7. A power transmitting, variable speed mechanism comprising a shaft; a driven member, a sun gear, an internal gear and a plurality of pinions carried by the driven member, in mesh with the aforesaid gears, all normally rotatable about said shaft; a clutch for each gear for connecting said gears alternatively to the shaft; means for holding said gears stationary, alternatively, and means for moving said clutches and gear-holding means, alternatively, whereby to clutch one gear to the shaft and to hold the other gear stationary.

8. A power transmitting, variable speed mechanism comprising a shaft; a driven pulley, a sun gear, and an internal gear normally loose about the shaft; planetary pinions in mesh with said gears and bodily rotatable with said pulley; a clutch, having one element normally connected with the shaft and a brake band to engage the other element of the clutch, one such clutch for each gear; an axially movable cone for connecting each clutch to its respective gear and an axially movable cone for closing said brake bands and a lever for coincidentally moving the clutch cone, for one gear, and the brake-band cone for the other gear, when the lever is shifted in opposite directions, to selectively connect one of said gears to the shaft and to hold the other gear stationary, to rotate the driven member at variable speeds.

9. A power transmitting mechanism comprising a shaft; a sleeve; a sun gear carried on said sleeve; an internal gear; said internal gear and sleeve each independently rotatable on said shaft; a driven member freely rotatable on said sleeve; intermediate planetary gears carried by the driven members and intermeshing with said sun gear and said internal gear; means to clutch the sun gear to the shaft; means to hold the sun gear stationary when its clutch is disengaged; means to clutch the internal gear to the shaft; means to hold the internal gear stationary when its clutch is disengaged and means to clutch both gears to the shaft and to disengage the holding means.

10. A power transmitting variable speed mechanism comprising a shaft; a sun gear normally loose thereon; means to clutch the sun gear to the shaft; means to hold the sun gear stationary when its clutch is disengaged; an internal gear normally loose on the shaft; means to clutch the internal gear to the shaft when its clutch is disengaged; a driven member; planetary pinions bodily rotatable with said driven member and in mesh with the two gears, and means for clutching either gear to the shaft and coincidentally holding the other gear stationary and means for simultaneously clutching both sun gear and internal gear to the shaft.

11. A power transmitting variable speed mechanism comprising a driving shaft; a driven pulley; a sun gear and an internal gear, normally loose on the shaft; planetary pinions in mesh with said gears and bodily rotatable with said pulley; a clutch having one element normally connected with the shaft and a brake band to engage the other element of the clutch; one said clutch and brake for each said gear; an axially movable cone for operating each clutch and an axially movable cone for operating each said brake band, and a lever for coincidentally moving the clutch cone for one gear and a brake band cone for the other gear, when the lever is shifted, to selectively connect one of said gears to the shaft and to hold the other gear stationary or to connect both gears to the shaft and coincidentally release the brake bands to rotate the driven member at variable selected speeds.

In testimony whereof I hereunto set my hand.

WILLIAM T. McCULLOUGH.

Copies of this patent may be obtained for five cents each, by addressing the "Commissioner of Patents, Washington, D. C."